United States Patent [19]

Stark

[11] Patent Number: 5,037,153
[45] Date of Patent: Aug. 6, 1991

[54] MOVABLE LOAD SUPPORT ASSEMBLY

[76] Inventor: Gary L. Stark, 305 N. Monroe, Carrollton, Mo. 64633

[21] Appl. No.: 526,017

[22] Filed: May 21, 1990

[51] Int. Cl.[5] .............................................. B60P 1/52
[52] U.S. Cl. .................................... 296/37.6; 224/281
[58] Field of Search ............... 296/37.6, 100; 224/273, 224/281

[56] References Cited

U.S. PATENT DOCUMENTS

| 3,640,565 | 2/1972 | Anderson | 296/100 |
| 4,522,326 | 6/1985 | Tuohy | 296/37.6 |
| 4,531,774 | 7/1985 | Whatley | 296/37.6 |
| 4,824,158 | 4/1989 | Peters et al. | 296/37.6 |

Primary Examiner—Robert R. Song
Attorney, Agent, or Firm—Litman, McMahon & Brown

[57] ABSTRACT

A movable load support assembly for mounting storage units such as tool boxes onto a truck bed is provided. Guide rails are mounted on opposing side walls of the truck bed. The tool box is mounted on a pair of support members each of which includes a roller assembly to allow the support members and storage unit to freely move along the guide rails. A locking mechanism is provided to securely position the tool box at a desired location along the guide rails. Means are provided to allow the assembly to be used with trucks having non-parallel side walls.

12 Claims, 2 Drawing Sheets

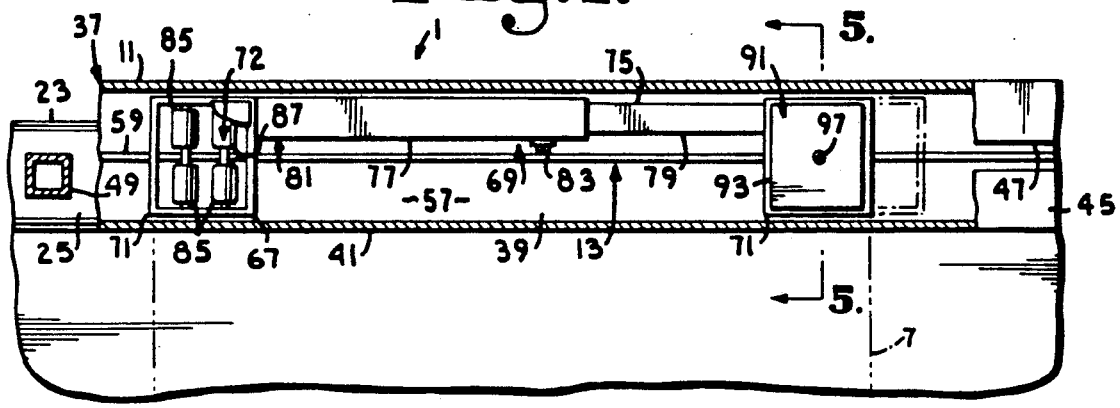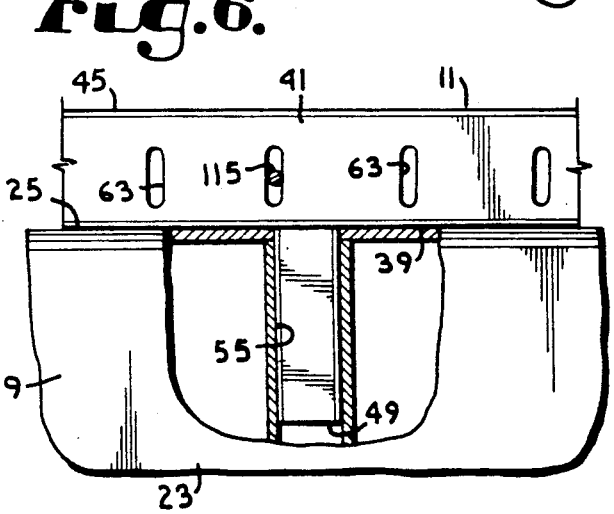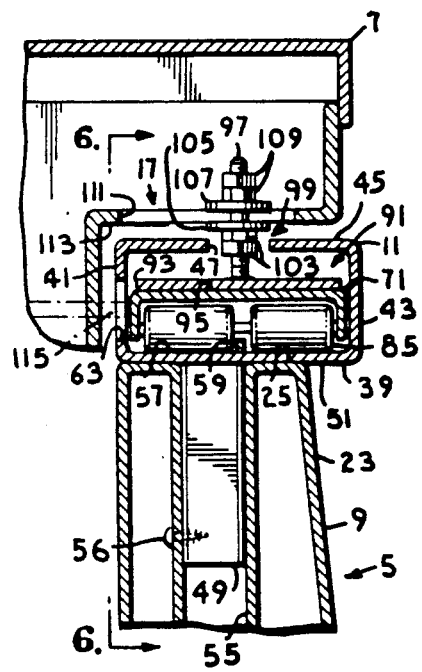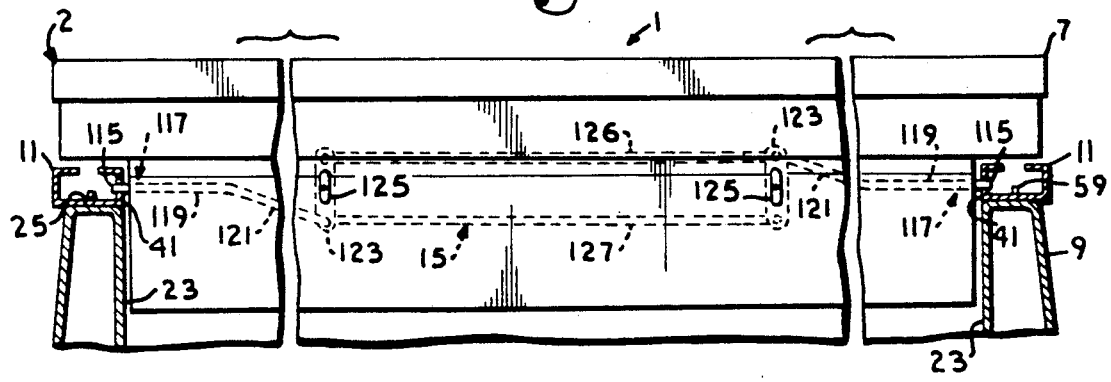

MOVABLE LOAD SUPPORT ASSEMBLY

BACKGROUND OF THE INVENTION

1. Field of the Invention

The present invention relates to movable load support assemblies in general and in particular to such assemblies which allow the mounting of a storage unit such as a tool box or a camper onto a vehicle.

2. Description of the Related Art

There have been several prior methods of mounting a storage unit such as a tool box onto a vehicle such as a pickup truck. A first of these methods comprises mounting a tool box longitudinally on either side of the pickup truck bed. Even though a user of such a tool box has relatively easy access to the full length of the tool box, the utilization of the truck bed is severely impaired since the tool boxes must, by necessity, be mounted atop the bed side walls in order to avoid interference with the rear wheel wells of the truck. This impairs access to the bed of the truck from the sides due to the required height of the tool boxes. A further problem associated with this type of tool box is that they are generally not available as a removable after-market add-on device. Rather, when a user desires to acquire such a tool box, the user must either order the truck from the factory fitted with such a box or order a bare-framed truck and have a special bed tool box assembly fabricated for him, at a comparatively significant expense to the user.

In response to both a large demand for truck bed-mounted tool box assemblies and the disadvantages of the aforementioned design, a tool box assembly was designed which was securely positioned transversely across a front portion of an associated pickup bed. Such tool boxes generally have a top cover divided into two portions, each pivotally connected at a central transverse portion of the tool box and opening upwardly in a gull wing fashion. Because of the positioning of such tool boxes at the front end of the associated truck bed, and because of the configuration of the top cover, only a small portion of the tool box storage space was readily accessible by a user standing outside the pickup. That portion of the tool box storage space which lies in the middle of the tool box can be difficult to access whereby the usefulness of the available storage space is compromised. Further, the mounting design of such tool boxes did not lend them to easy removability from an associated truck.

Therefore, even though there exist tool box storage assemblies for use with small trucks, these assemblies have many drawbacks, including expense, lack of efficient usage of storage space, and nonremovability.

Other storage units have been developed which can be positioned on truck beds including self-enclosed campers, pud camper shells or covers. Such storage units can be difficult to remove from the associated pickup truck beds.

Heretofore, there has not generally been available a movable load support assembly with the advantages and features of the present invention.

SUMMARY OF THE INVENTION

In the practice of the present invention, a movable load support assembly is provided for mounting a load such as a tool box, a self-enclosed camper or a camper shell onto a vehicle such as a small pickup truck. The assembly includes guide rails which are mounted atop opposing side walls of the truck bed. A support truck member is positioned atop each guide rail on rollers. A centering means is provided to keep each support truck member aligned over a respective guide rail. The rollers allow the support truck members to move longitudinally along the guide rails. Mounting means are provided which allow the load to be mounted onto the support trucks. A locking mechanism is provided for securing the storage unit in a desired position longitudinally along the guide rails. A transverse positioning means is further provided which allows the mounting means to move transversely with regard to the storage unit when the storage unit is moved along guide rails which are nonparallel.

Removable end caps are provided with the guide rail members which prohibit removal of a support truck member from an associated guide rail member. Removing the end caps allows the support truck members to be slid outwardly from the guide rail members, allowing easy removability of the load from the truck.

OBJECTS OF THE INVENTION

The principle objects of the present invention are: to provide a movable load support assembly capable of mounting a load onto a suitable support unit such as a truck; to provide such an assembly which allows the load to be selectively movable longitudinally along the support unit; to provide such an assembly which allows the load to be easily removed from the support unit; to provide such an assembly which allows the load to be easily locked in a desired position longitudinally along the support unit; to provide such an assembly which allows the mounting of loads having varying longitudinal dimensions; to further provide such an assembly which allows the mounting of loads on support units which have nonparallel side walls; and to further provide such an assembly which allows easy access to a complete inner volume of the load.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a fragmentary, cross-sectional plan view of the movable load support assembly taken generally along line 4—4 in FIG. 3 showing in particular an extendable support member thereof.

FIG. 5 is a cross-sectional end view taken generally along line 5—5 in FIG. 4 showing a load support member as it is operably positioned within a guide rail member.

FIG. 6 is a fragmentary, cross-sectional side view taken generally along line 6—6 in FIG. 5 showing a guide rail member as it is mounted on a truck bed.

FIG. 7 is a fragmentary end view showing the assembly and in particular a locking mechanism therefor.

DETAILED DESCRIPTION OF THE INVENTION

I. Introduction and Environment

Figure 1:
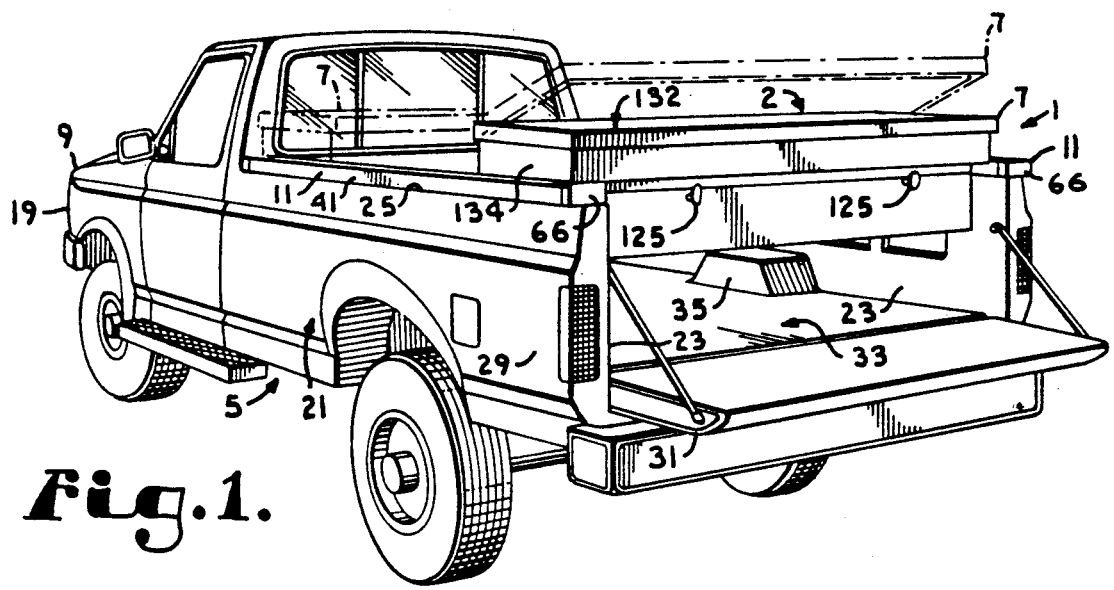
FIG. 1 is a left side, rear perspective view of a pickup truck showing a movable load support assembly embodying the present invention mounting a load comprising a tool box thereon.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a movable load support assembly embodying the present invention. The movable load support assembly 1 is used for mounting a load 2 upon a support unit 5. As shown in the drawings, the load 2 comprises a transversely-aligned tool box 7. The support unit 5 comprises a vehicle in the nature of a pickup truck 9.

The associated pickup truck 9 generally includes a front portion 19 and a rear portion thereof generally described as a bed 21. The bed 21 further comprises laterally-spaced and longitudinally-aligned vertical side walls 23 each having a top surface 25 thereof. The bed 21 further includes a first, forward portion 27 generally adjacent the front portion 19 of the pickup truck 9, and a second, rear portion 29 generally comprising a tailgate 31. Extending into an inner volume 33 of the pickup truck bed 21 are rear wheel well inner surfaces 35.

Even though the drawings show such a tool box 7 and pickup truck 9, it is to be understood that loads 2 of a differing nature can be mounted onto support units 5 of a varying nature and still contain the embodiments of this invention. The use of a tool box 7 and of a pickup truck 9 are not to be limiting, but are merely exemplary of the practice of the present invention.

II. The Movable Load Support Assembly 1

The movable load support assembly 1 generally comprises two laterally-spaced guide rail members 11; a pair of load support members 13, each of said pair engaging an associated guide rail member 11; a locking means 15, as best shown in FIG. 7; and a transverse positioning means 17.

Each guide rail member 11 comprises a channel member 37 having a bottom wall 39, an inner side wall 41, an outer side wall 43 and an upper wall 45 having a groove 47 formed therein and longitudinally aligned therewith. One or more anchor members 49 are secured to the guide rails 11 and depend downwardly from the bottom walls 39 thereof.

The guide rail members 11 rest on the pickup truck side walls 23 such that a bottom surface 51 of each channel member bottom wall 39 rests on the top surface 25 of an associated truck side wall 23. The channel member anchors 49 fit within stake receptacles 55 in the pickup truck side walls 23 to anchor and secure the guide rails 11 in place relative to the pickup truck side walls 23. A suitable retainer means such as screws 56 are provided which operably extend through receptacles 55 and anchors 49 securing the anchors 49 in place.

A top surface 57 of each channel member bottom wall 39 comprises a bearing surface and further includes a centering wall 59 which extends upwardly therefrom in a generally central portion of the channel member bottom wall 39. The centering wall 59 runs longitudinally along the channel member bottom wall top surface 57 and is longitudinally aligned therewith. Each channel member inner side wall 41 contains a plurality of apertures 63. Removable end caps 66 are provided at both ends of each guide rail member 11 to retain each of the load support members 13 within an associated channel member 37.

Each load support member 13 comprises a support truck member 67. Each support truck member 67 includes a frame 69 which is extendable longitudinally and which comprises an inner member 75 which telescopes within an outer member 77. Dollies 71 are provided, each having a positioning means 72 associated therewith to allow the dollies 71 to be movable longitudinally with respect to the guide rails 11. A dolly 71 is positioned at each distal end 79 and 81 respectively of frame members 75 and 77.

Means are provided to lock the extendable frame 69 in a desired extended position. One method of doing this is as shown in the drawings (FIG. 4) wherein such means are depicted as comprising a locking bolt 83 which is threaded through an associated threaded aperature, not shown, formed in the extendable frame outer member 77. Upon rotating the locking bolt 83 through the aperature, an end surface of the bolt 83 frictionally engages a side surface of the extendable frame inner member 75, prohibiting relative movement between the extendable frame inner member 75 and outer member 77, therefore securely retaining the extendable frame 69 in a desired degree of extension.

As shown in the drawings, the positioning means 72 comprises one or more axially-aligned and laterally-spaced pairs of rollers 85. As best seen in FIG. 5, each of these rollers 85 includes an inner side surface 87 which is in position to bear against the centering wall 59. The rollers 85 further have their respective axies aligned transversely to the longitudinal guide rail members 11 and ride along and bear upon the channel member bottom wall top surface 57 so as to be longitudinally movable therealong.

Each of the support truck members 67 has an associated load mounting member 91 affixed thereto. As shown best in FIG. 5, the load mounting member 91 comprises a mounting plate 93 securely affixed to a top surface 95 of each of the support truck member dollies 71; a support rod 97 which extends upwardly therefrom; and a load bearing member 99 upon which the load rests. As can be seen in FIG. 5, the support rod 97 extends upwardly from the mounting plate 93 through the channel member upper wall groove 47. Further, the support rod 97 is a threaded member. The load bearing member 99 comprises two locknuts 103 retaining a bottom, bearing washer 105 in a desired threaded position along the threaded support rod 97 which, in turn, dictates the spacing between the bearing washer 105 and the support truck members 67. Also associated with the support rod 97 is a top washer 107 and locknuts 109.

Longitudinally-spaced transverse grooves 111 are cut through a bottom wall 113 of the tool box 7 and partially comprise the transverse positioning means 17. The support rod 97 extends through each of such transverse grooves 111, allowing the tool box bottom wall 113 to rest on the bearing washer 105 thereby supporting the tool box 7 on the movable load assembly 1.

The top washer 107 frictionally contacts a top surface of the tool box bottom wall 113. The frictional resistance between the tool box bottom wall 113 and the top and bottom washers 107 and 105 can be varied by the selective tightening of locknuts 109.

The locking means 15, as best shown in FIG. 7, comprises two bayonet pins 115 attached to distal ends 117 of pushrods 119. The pushrods 119 are attached at proximal ends 121 thereof to a respective bellcrank 123 each of which is securely attached to a manipulatable handle 125. The bellcranks 123 are ganged together by connecting rods 126 and 127 which extend between the two bellcranks. The bayonet pins 115 are alignable with the various channel member inner side wall apertures 63, as best shown in FIG. 6.

In the tool box configuration shown herein, the tool box 7 includes a top cover 132 and a main body 134. The top cover 132 is hingedly attached to the tool box main body 134 by hinge means 136 which hingedly connects the tool box top cover 132 to the tool box main body 134. Retainer clips 144 are provided depending downwardly from the tool box main body 134 for retaining a spare tire 150 thereto.

III. Operation

Figure 2:
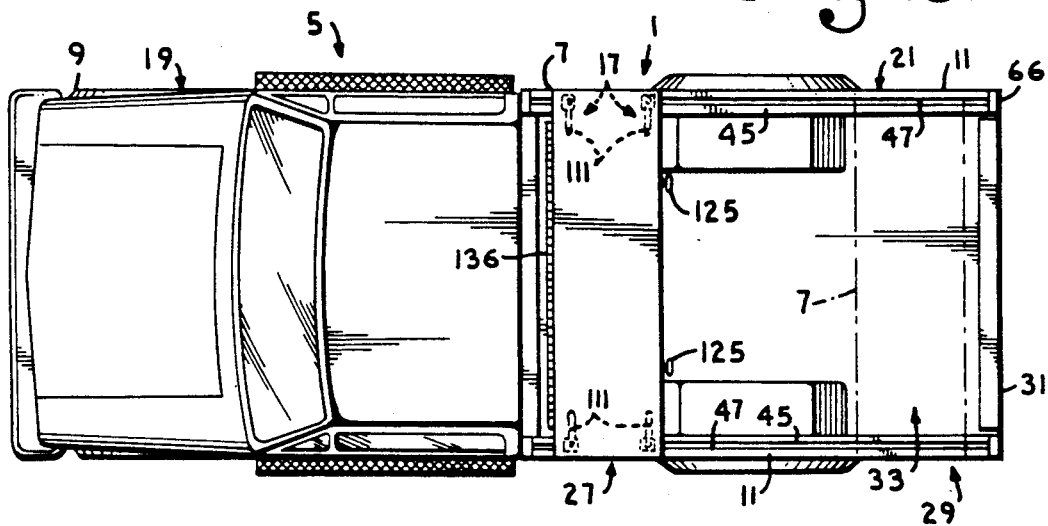
FIG. 2 is a top plan view of the movable load support assembly.
Figure 3:
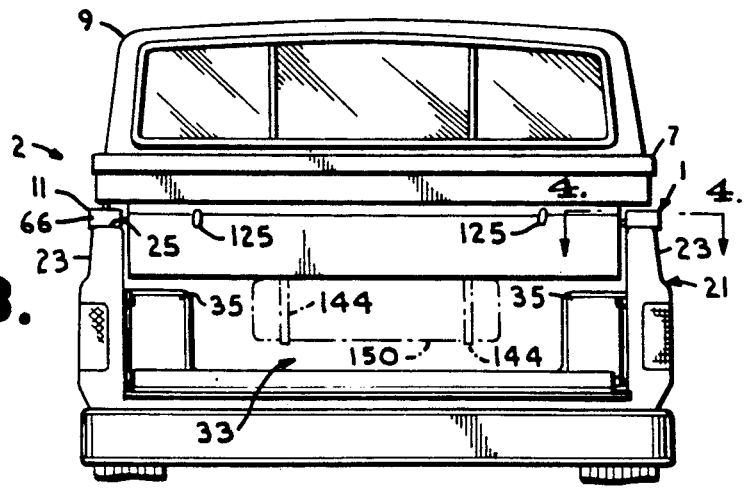
FIG. 3 is an end view of the movable load support assembly.

In operation, the movable load support assembly allows a load 2, shown here as the tool box 7, to be movably mounted upon an appropriate load support unit 5, shown here as the pickup 9. Particularly, as seen in FIG. 1, the movable support assembly 1 allows the tool box 7 to be selectively movable longitudinally between a first position adjacent the pickup truck bed forward portion 27, as shown in solid lines in FIG. 2, and a second position adjacent the pickup truck bed tailgate 31, as shown in solid lines in FIG. 1. Further, by removing guide rail member end caps 66 the movable load support assembly 1 allows the quick and easy removal of the tool box unit 7 from the pickup truck 9.

Specifically, when mounting the tool box 7 onto the pickup truck 9, a user would remove the end caps 66 from the guide rail members 11 and position the tool box 7 such that support truck members 67 are positioned within the channel member 37 and the associated dolly rollers 85 rest on the guide rail bottom wall top surface 57. The user would then slide the tool box 7 toward the pickup truck bed front portion 27 aligning the remaining dolly rollers 85 onto the guide rail bottom wall top surface 57, at which point the movable support assembly 1 is freely movable between positions adjacent the truck tailgate 31 and the pickup bed forward portion 27. Upon repositioning the end caps 66 onto the guide rail members 11, the load 2 is securely but movably retained by the assembly 1.

In the movable operation of the load assembly 1, each pair of rollers 85 bears on and rolls across an associated guide rail member bottom wall top surface 57. The lateral position of the individual roller pairs 85 on the bottom wall top surface 57 is maintained by the roller inner surfaces 87 coming into contact with the guide member centering wall 59, all as best shown in FIG. 5. As the movable support assembly 1 is moved longitudinally fore and aft along the guide rail member bottom wall top surfaces 57, the roller inner surfaces 87 contact the centering wall 59, maintaining the alignment of the support truck member 67 within the guide rail member channel member 37.

When it is desired to securely retain the movable support assembly 1 in a selected longitudinal position, the locking means handles 125 are rotated such as to bias the bayonet pins 115 through a desired channel member side wall aperture 63. In doing so, the bayonet pins 115 secure the movable support assembly 1 in a desired longitudinal position prohibiting the movable support assembly from thereafter moving longitudinally until the locking means handle 125 is again rotated, retracting bayonet pins 115 from engagement with the apertures 63.

Accommodations for storage units 3 having differing longitudinal dimensions can be made by adjusting the longitudinal extension of the support truck member extendable frame 69. This is done by releasing the bearing bolt 83 and moving the first and second extendable frame members 75 and 77 to effectuate a desired extension of the associated support truck members 67 and then retightening bearing bolt 83 to retain the extension frame members 75 and 77 at their desired longitudinal extension.

The extension of the extendable frame members 75 and 77 is such that the spacing between the two support rods 97 associated with each support truck member 67 is equal to the spacing between the associated tool box transverse grooves 111.

In order to accommodate the support of a storage unit 3 which has a longitudinal dimension substantially greater than that of tool box 7, such as a self-enclosed camper or a camper shell, not shown, an additional support truck member 67 can be attached to each side of such a larger unit and positioned within a respective guide member channel. As such, a forward pair of support truck members, not shown, would engage a forward portion of the longer storage unit, not shown, and a rearward pair of support truck members, not shown, would engage a rear portion of the larger storage unit, not shown. Such an accommodation would allow for the easy removal and positioning of the larger storage unit on the pickup truck 9.

In order to accommodate a pickup truck 9 whose side walls are nonparallel, the tension in the top locknuts 109 is reduced to the extent that the frictional resistance between the tool box bottom wall 113 and the top and bottom bearing washers 107 and 105 respectively is reduced, allowing the support rods 97 to freely move transversely within the tool box bottom wall transverse grooves 111. As the tool box 7 is moved along such nonparallel side walls, the roller inner surfaces 87 engage the associated guide rail centering wall 59, biasing the support truck member 67 transversely relative to the tool box 7 and moving the support rods 97 relative to the transverse grooves 111.

When the tool box 7 is moved to a position adjacent the truck tailgate 31, the entire contents of the tool box 7 is available to a user by opening the top cover 132. Further, in this position, the spare tire 150 is readily accessible.

It is to be understood that while certain forms of the present invention have been illustrated and described herein, it is not to be limited to the specific forms or arrangement of parts described and shown.

What is claimed and desired to be secured by Letters Patent is as follows:

1. In combination with a truck having a bed attached thereto, said bed having two transversely-spaced, longitudinally aligned, vertical side walls, a movable load support assembly adapted to support a load on said bed, said load having a longitudinal dimension and a transverse dimension, said movable load support assembly comprising:
- (a) two guide rail members, one each positioned atop a respective truck bed side wall and longitudinally aligned therewith;
- (b) a pair of load support means for supporting a load thereon, each engaging an associated guide rail member and selectively movable longitudinally along said guide rail; and
- (c) each side load support means comprising a truck member, each of said truck members including two longitudinally-spaced dolly members, said dolly members each including a load engagable mounting means.

2. The movable load support assembly according to claim 1, including:
- (a) locking means for selectively securing said load support means to said guide rail members at a desired longitudinal position therealong.

3. In combination with a truck having a bed attached thereto, said bed having two transversely-spaced, longitudinally aligned, vertical side walls, a movable load support assembly adapted to support a load on said bed, said load having a longitudinal dimension and a transverse dimension, said movable load support assembly comprising:
- (a) two guide rail members, one each positioned atop a respective truck bed side wall and longitudinally aligned therewith;
- (b) a pair of load support means for supporting a load thereon, each engaging an associated guide rail member and selectively movable longitudinally along said guide rail; and
- (c) transverse positioning means allowing said load support means to be freely positionable transversely relative to said load.

4. In combination with a truck having a bed attached thereto, said bed having two transversely-spaced, longitudinally aligned, vertical side walls, a movable load support assembly adapted to support a load on said bed, said load having a longitudinal dimension and a transverse dimension, said movable load support assembly comprising:
- (a) two guide rail members, one each positioned atop a respective truck bed side wall and longitudinally aligned therewith;
- (b) a pair of load support means for supporting a load thereon, each engaging an associated guide rail member and selectively movable longitudinally along said guide rail; and
- (c) said guide rail members each including a bearing surface running longitudinally therealong; each of said support members including a roller assembly, said roller assemblies each engaging and supporting an associated support member on an associated rail member bearing surface and rollable longitudinally thereover; and
- (d) a centering means keeping each of said roller assemblies centered over an associated guide rail member bearing surface.

5. The movable load support assembly according to claim 3 wherein:
- (a) each of said load support means comprises a truck member, each of said truck members including two longitudinally-spaced dolly members, said dolly members each including a load engageable mounting means; and
- (b) said dolly members are mounted on opposite ends of a support frame selectively extendable longitudinally allowing the support of loads of differing longitudinal dimensions.

6. The movable load support assembly as set forth in claim 1 wherein:
- (a) said guide rail members each include a bearing surface running longitudinally therealong; and
- (b) each of said support members includes a roller assembly, said roller assemblies each engaging and supporting an associated support member on an associated rail member bearing surface and rollable longitudinally thereover.

7. The movable load support assembly as set forth in claim 4 wherein:
- (a) said centering member comprises a centering wall extending upwardly from a central lateral position of said bearing surface and running longitudinally therealong; and
- (b) each of said roller assemblies comprises two laterally-spaced, axially-aligned rollers, each having an inner end bearing surface, said rollers being positioned on opposed sides of said centering wall, each of said roller inner end surfaces engageable with said centering wall keeping each of said support members aligned over an associated guide rail member.

8. The movable load support assembly as claimed in claim 7 wherein:
- (a) said guide rail members each have longitudinal inner side walls, said side walls each including a plurality of lock engaging members longitudinally spaced therealong; and
- (b) said assembly includes a lock member attached to said support members selectively engageable with said side wall lock engaging members.

9. The movable load support assembly in accordance with claim 8 wherein:
- (a) said lock engaging members comprise a plurality of apertures formed in each of said respective guide rail member inner side walls and spaced longitudinally therealong; and
- (b) said lock member comprises a bayonet pin selectively positional through a desired one of said apertures.

10. In combination with a truck having a bed attached thereto, said bed comprising two transversely-spaced, longitudinally-aligned, vertical side walls, a first, forward, vertical transverse end wall and a second, rearward, vertical transverse end wall comprising a tailgate, a movable storage assembly comprising:
- (a) two guide rail members, one each positioned atop a respective truck bed side wall and aligned longitudinally therewith; said guide rail members comprising a channel member having a bottom wall, inner and outer side walls and a top wall having a longitudinal groove positioned therein; said channel bottom wall having a top surface thereof comprising a bearing surface, said bearing surface having a center wall extending upwardly therefrom intermediate said two side walls, said center wall longitudinally aligned with said bearing surface; said respective channel member inner walls having a plurality of apertures longitudinally spaced therealong;
- (b) two support truck members, one each positioned within a respective rail member, said support truck members each comprising two dolly members connected by a longitudinally extendable support frame, each of said dolly members having a roller assembly attached thereto, said roller assemblies each comprising at least one pair of laterally spaced, axially-aligned rollers, each roller of said roller pairs being positioned on opposite sides of said bearing surface center wall, the axis of said rollers being transverse to said bearing surface longitudinal alignment allowing rotational movement of said rollers along said bearing surface; each of said rollers having an inner end surface engageable with said bearing surface center wall;

(c) a tool box mounting member attached to each of said dolly members engageable with said tool box and mounting said tool box onto said support truck members, said tool box mounting members each including a support rod extending upwardly from air associated dolly member and through an associated channel member top wall groove and a bearing plate attached to each of said support rods, said bearing plate being positioned above said channel groove allowing said tool box to rest thereon, said support rod extending upwardly through said bearing plate;

(d) a tool box having two spaced transverse side walls, a bottom wall having a bottom surface, two spaced end walls, a first facing said bed forward end wall and a second facing said bed second end wall, said tool box further including a top surface comprising a cover, said tool box bottom wall including two transverse grooves formed in each side thereof, each receiving an associated support rod therethrough, said support rods being transversely movable within said grooves, said tool box bottom surface resting on said bearing plates; and (e) a locking means comprising two bayonet pins, each selectively positionable within one of said apertures in each of said rail member side walls, said locking means further comprising two pushrods having an associated bayonet pin attached at a distal end each thereof and each pushrod being attached at a proximal end thereof to a bellcrank which comprises a handle allowing said handle to rotate said bellcrank selectively biasing said bayonet pins into a position engageable with said respective channel inner wall apertures.

11. The movable tool box assembly as set forth in claim 10 wherein:

(a) said tool box top surface includes a first transverse end adjacent said tool box first forward end wall; and (b) said tool box top surface is hingedly connected to said tool box first forward end wall at said tool box top surface first transverse end.

12. The invention of claim 1 wherein:

(a) said dolly members are mounted on opposite ends of a support frame selectively extendable longitudinally allowing the support of loads of differing longitudinal dimensions.

* * * * *